Patented Aug. 29, 1939

2,171,428

UNITED STATES PATENT OFFICE 2,171,428

COMPOSITION OF MATTER

Carroll L. Griffith and Lloyd A. Hall, Chicago, Ill., assignors to The Griffith Laboratories, Inc., a corporation of Illinois No Drawing. Application January 5, 1939, Serial No. 249,518

5 Claims. (Cl. 99—109)

This invention relates to a composition of matter, a method of preparing the same, and more particularly to a composition of matter for incorporation in and stabilization of sausage emulsions.

The manufacture of meat products for sausages has not been well developed in the literature. Sausage meat of the type most commonly employed, for example, in frankfurters and similar products, is an emulsion of meat, fat and water. In preparing this product the meat is placed in a machine called the silent cutter which consists of a large bowl with a series of revolving knives operating at very high speed. In this machine the meat is reduced to very fine particles. During the operation it is customary to add about 50 pounds of ice or ice water to each 100 pounds of meat or meat by-products. The fine chopping and whipping action causes the meats to form a stable emulsion of a stiff dough consistency. In this operation, if the meat is not naturally fat, a certain proportion of fat trimmings is employed.

The preferred meat product is bull meat trimmings but this is quite costly and it is frequently difficult to obtain it. It is, therefore, necessary to use other meat materials which do not emulsify as well, and even with bull meat trimmings, the emulsion is not always satisfactory.

As a result the sausage, after manufacture, frequently develops water or fat pockets which are usually called jelly pockets. Furthermore, in the storage of the material before use in the silent cutter it is frequently found that several inches of liquid will collect in the bottom of the trimming barrel. This liquid cannot suitably be restored to the remainder of the meat and inasmuch as it contains valuable juice ingredients of the meat, the residual trimmings are deficient in this respect. Both of these difficulties may be overcome by the use of the present invention.

The efficiency of the present process is indicated by the fact that the silent cutter bowl is always left clean after used, whereas in prior practice there frequently was a layer of grease remaining therein after the sausage chopping had been completed.

In accordance with this invention, a composition of matter consisting essentially of the serum albumen of blood, dried milk (preferably skimmed), and vegetable gum, is added to the sausage meat prior to emulsification either in the silent cutter or in the pre-curing mixing and grinding operation.

In such use or prior thereto a solid solution of the solids of the blood serum and the milk solids is apparently formed and in those cases where vegetable gum is employed a three element solid solution is formed. This solid solution may be prepared in a number of ways. As an example of the preferred manner, 955 pounds of skimmed milk are mixed with 10 pounds of Irish moss gum until the latter has dissolved. The solution is then filtered to remove any silica or other extraneous matter which may have been present in the gum and the solution is concentrated to about 20% to 25% total solids in a vacuum evaporator. About 45 pounds of serum albumen containing 8% to 9% total solids is added to the concentrate. This serum may be obtained in the customary manner by centrifuging whole blood at high speed in the presence of an anti-coagulant such as sodium citrate. The blood separates into two fractions, the hemoglobin and the serum, constituting respectively, about 40% and 60% of the blood.

After the serum albumen has been added to the milk-gum mixture the product is dried either in a vacuum drum dryer or by spray drying, or by any other process in which the temperature does not exceed 135° F. Temperatures above this point adversely affect the emulsification and gelling properties of the product.

As another example of a method of preparing the composition, 4,625 pounds of skimmed milk containing approximately 9% of solids is concentrated in a vacuum evaporator to about 33% solids. About 890 pounds of serum albumen prepared as above described is added to the concentrated milk and the mixture dried to a powder in any suitable manner. The resulting powder weights about 500 pounds and will contain about 15% serum albumen solids. With this powder is physically incorporated 188 pounds of pure powdered Irish moss gum and 1,192 pounds of powdered skimmed milk, producing a mixture containing approximately 10% Irish moss gum and 4% serum albumen solids.

Instead of the above procedures, other methods of forming the desired product may be employed. For example, 3,735 pounds of skimmed milk and 1,780 pounds of serum albumen were mixed together and concentrated to about 33% solids and then vacuum or spray dried. The resulting material contained approximately 30% serum albumen solids.

The albumen-milk powder and the albumen-milk-gum powder when tested under X-ray showed diffraction patterns indicating complete solid solution.

It is preferred that the product have the following composition:

| | Parts |
|---|---|
| Blood albumen | 3-40 |
| Milk | 97-60 |
| Gum | 0-25 |

In practice it has been found that compositions containing between 3-10% blood albumen, 10-20% gum and 87-70% milk prove the most desirable for sausage products.

In a specific example of the process 3½ pounds of a composition of

| | Per cent |
|---|---|
| Albumen milk solids (15% albumen) | 27 |
| Gum karaya | 7 |
| Irish moss | 3 |
| Skimmed milk powder | 63 | were incorporated with ten pounds of fat material such as back fat, sweet pickle ham trimmings, beef tallow or other types of animal fat, after the fat material had been reduced to relatively fine consistency in the silent cutter. As soon as the albumen-gum-milk mixture had been incorporated ten pounds of luke warm water were added and the chopping continued for four or five minutes or until all of the water had been absorbed and the mass whipped to a soft doughy emulsion.

This concentrated emulsion may then be employed as an ingredient of the sausage formula. It may be employed in frankfurter formulae for example without alteration of the formulae except the difference of this material. For example, in a frankfurter sausage formula calling for 100 pounds of meat material and 50 pounds of water, 23½ pounds of the above material may be added to the formula. This is at the rate of 3½ pounds of the emulsifying composition to 170 pounds of emulsified meat or to 110 pounds of meat. While this percentage has proved in general most satisfactory, the amount may be varied upwardly or downwardly depending upon the results desired or the character of the meat used. Not less than 1 pound of the emulsifying composition and generally not more than 5 pounds, should be employed for each 100 pounds of meat or each 150 pounds of sausage emulsion.

If desired, the emulsifying composition may be mixed with the meat prior to the curing operation. In such case it may be mixed with salt and other curing materials such as saltpetre and then added to the trimmings. The whole mixture is run through the grinder in the customary pre-curing operation and the product then cured for twenty-four hours to a week or more, as desired.

As an example of a mixture for this purpose we have employed:

| | Pounds |
|---|---|
| Albumen solids (15% albumen, 85% milk solids) | 27 |
| Powdered Irish moss | 10 |
| Salt | 70 |
| Skimmed milk | 23 |

To this is added the desired curing material such as saltpetre and it is mixed with trimmings at the rate of 4½ pounds of the above mixture to 100 pounds of trimmings. The 4½ pounds contains all the salt required to preserve the meat.

The blood serum albumen and the milk powder, besides forming a solid solution of desirable characteristics, co-act with each other to produce a sausage which is suitable under all conditions. The serum alone tends to set up to form a sausage which is too hard whereas the milk alone is too soft. Furthermore, the serum albumen is denatured by heat whereas the milk tends to improve with heat. The resulting sausage is firmer, has better textures and slicing qualities and is more suitable than can be obtained by the use of either ingredient alone within suitable ranges of proportions.

The addition of the gum to the solid solution, forming as it does a three element solid solution, apparently tends to stabilize the solid solution or to facilitate its formation in this instance where it is not pre-formed.

We claim:

1. An emulsifying composition comprising 3-40% of blood serum solids, 87-60% of milk solids and 10-25% of vegetable gum.

2. A composition of matter comprising 3-10% of blood serum solids, 87-70% of milk solids and 10-20% of vegetable gum.

3. The method of forming a solid solution of milk and blood serum solids which comprises mixing substantially pure serum albumen and milk and vegetable gum in the proportion set forth in claim 2, in their natural aqueous environment and drying the mixture to a powder without exceeding a temperature of 135° F.

4. A solid solution consisting essentially of 3-40 parts of blood albumen, 97-60 parts of milk and 0-25 parts of vegetable gum.

5. A solid solution consisting essentially of 3-10 parts of blood albumen, 87-70 parts of milk and 10-20 parts of vegetable gum.

CARROLL L. GRIFFITH.
LLOYD A. HALL.